United States Patent
Yoda

(10) Patent No.: US 9,389,812 B2
(45) Date of Patent: Jul. 12, 2016

(54) INFORMATION PROCESSING DEVICE, INFORMATION PROCESSING METHOD, AND NON-TRANSITORY COMPUTER READABLE MEDIUM

(71) Applicant: FUJI XEROX CO., LTD., Tokyo (JP)

(72) Inventor: Yoshiyuki Yoda, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/043,234

(22) Filed: Oct. 1, 2013

(65) Prior Publication Data
US 2014/0268218 A1 Sep. 18, 2014

(30) Foreign Application Priority Data
Mar. 18, 2013 (JP) ................. 2013-054895

(51) Int. Cl.
G06F 3/12 (2006.01)
G06K 15/00 (2006.01)
G06K 15/02 (2006.01)

(52) U.S. Cl.
CPC .............. *G06F 3/121* (2013.01); *G06F 3/1236* (2013.01); *G06F 3/1285* (2013.01); *G06K 15/1818* (2013.01); *G06K 15/4045* (2013.01)

(58) Field of Classification Search
None
See application file for complete search history.

(56) References Cited

U.S. PATENT DOCUMENTS

| | | | | |
|---|---|---|---|---|
| 6,567,410 B1* | 5/2003 | Perlman | ................ | H04L 12/462 370/248 |
| 7,934,014 B2* | 4/2011 | Ishida | ................ | H04L 12/2818 709/238 |
| 2004/0120301 A1* | 6/2004 | Kitchin | ................ | H04W 16/14 370/345 |
| 2009/0175268 A1* | 7/2009 | Li | ................ | H04L 29/06027 370/352 |
| 2009/0201938 A1* | 8/2009 | Sato | ................ | H04W 48/02 370/401 |
| 2010/0110904 A1* | 5/2010 | Wimmer | ................ | H04L 1/22 370/248 |
| 2010/0245880 A1* | 9/2010 | Miura | ................ | 358/1.13 |
| 2011/0261797 A1* | 10/2011 | Yamaguchi | ......... | H04W 72/048 370/338 |
| 2011/0283143 A1* | 11/2011 | Collins | ................ | G06F 21/85 714/37 |
| 2013/0141753 A1* | 6/2013 | Kamoi | ............... | G06K 15/4095 358/1.14 |

FOREIGN PATENT DOCUMENTS

| | | |
|---|---|---|
| JP | A-08-179898 | 7/1996 |
| JP | H11-345193 A | 12/1999 |
| JP | 2001-028595 A | 1/2001 |

OTHER PUBLICATIONS

Jun. 16, 2015 Office Action issued in Japanese Patent Application No. 2013-054895.

* cited by examiner

*Primary Examiner* — Nicholas Pachol
(74) *Attorney, Agent, or Firm* — Oliff PLC

(57) ABSTRACT

An information processing device includes a first communication interface, a second communication interface, a detecting unit, and a controller. The detecting unit detects a notification received by the first communication interface. In a case where the detecting unit detects a notification transmitted from the second communication interface to a communication medium connected to the second communication interface and indicating that a device serving as a transmission source has been connected to the communication medium, the controller performs control so that communication is not performed by at least one of the first communication interface and the second communication interface.

6 Claims, 3 Drawing Sheets

INFORMATION PROCESSING DEVICE, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-054895 filed Mar. 18, 2013.

BACKGROUND (i) Technical Field

The present invention relates to an information processing device, an information processing method, and a non-transitory computer readable medium.

(ii) Related Art

Information processing devices including plural communication interfaces are available.

SUMMARY

According to an aspect of the invention, there is provided an information processing device including a first communication interface, a second communication interface, a detecting unit, and a controller. The detecting unit detects a notification received by the first communication interface. In a case where the detecting unit detects a notification transmitted from the second communication interface to a communication medium connected to the second communication interface and indicating that a device serving as a transmission source has been connected to the communication medium, the controller performs control so that communication is not performed by at least one of the first communication interface and the second communication interface.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described in detail with reference to the drawings.

Figure 1:
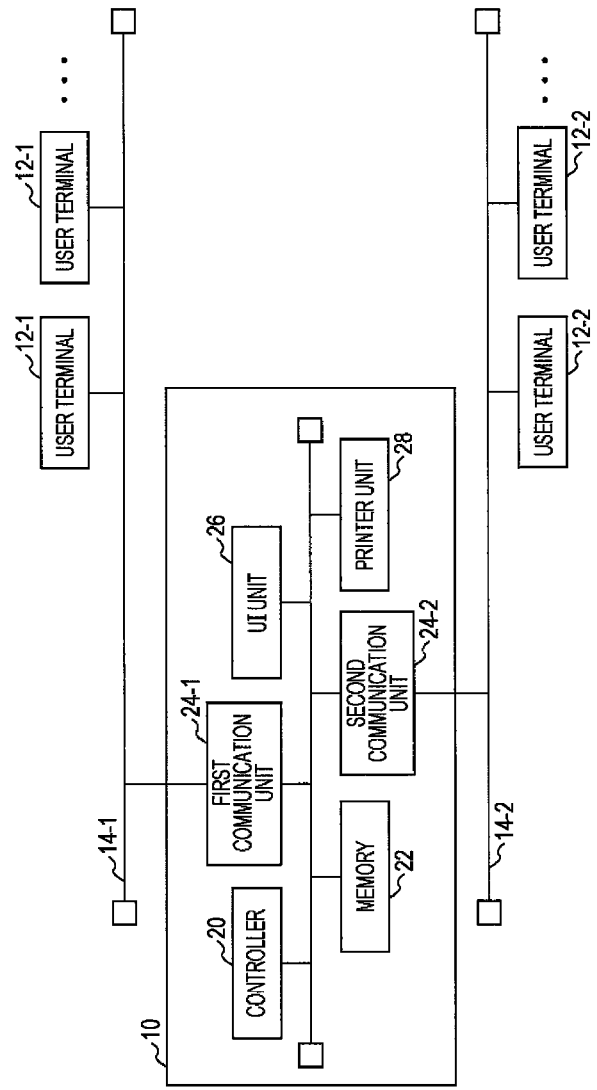
FIG. 1 is a diagram illustrating an example of the entire configuration of the exemplary embodiment of the present invention.

FIG. 1 is a diagram illustrating an example of the entire configuration of the exemplary embodiment. As illustrated in FIG. 1, an image forming device 10 according to the exemplary embodiment is connected to plural user terminals 12 via communication media (in the exemplary embodiment, communication networks such as local area networks (LANs) 14, for example).

The image forming device 10 according to the exemplary embodiment includes, for example, a controller 20, a memory 22, a first communication unit 24-1, a second communication unit 24-2, a user interface (UI) unit 26, and a printer unit 28. These elements are connected to one another via a bus or the like. In the exemplary embodiment, the image forming device 10 illustrated in FIG. 1 serves as an information processing device according to the exemplary embodiment.

The controller 20 is a program control device, such as a central processing unit (CPU), and operates in accordance with a program installed into the image forming device 10. The memory 22 is a storage element such as a read only memory (ROM) or a random access memory (RAM), a hard disk drive, or the like. The memory 22 stores, for example, a program executed by the controller 20. Also, the memory 22 operates as a working memory of the controller 20. The first communication unit 24-1 and the second communication unit 24-2 are communication interfaces, such as network boards. The first communication unit 24-1 is a first interface and the second communication unit 24-2 is a second interface, for example. The first communication unit 24-1 and the second communication unit 24-2 manage a network protocol such as the Internet protocol (IP). The UT unit 26 is constituted by a touch panel, a liquid crystal display, a button, and so forth. The UI unit 26 displays a screen that is based on data received from the controller 20, in response to an instruction received from the controller 20. Also, the UI unit 26 accepts input of an instruction from a user, and outputs the instruction to the controller 20. The printer unit 28 forms an image on a recording medium, such as a paper medium, by using information received from the controller 20.

Each of the user terminals 12 according to the exemplary embodiment is constituted by an existing personal computer that includes a control device such as a CPU, storage elements such as a ROM and a RAM, a storage device such as a hard disk drive, an output device such as a display, input devices such as a mouse and a keyboard, and a communication device such as a network board. The plural user terminals 12 according to the exemplary embodiment are grouped into a first group of user terminals 12-1 that are connected to a first communication medium (in the exemplary embodiment, for example, a first LAN 14-1), and a second group of user terminals 12-2 that are connected to a second communication medium (in the exemplary embodiment, for example, a second LAN 14-2).

The image forming device 10 according to the exemplary embodiment is connected to the first LAN 14-1 via the first communication unit 24-1, and is connected to the second LAN 14-2 via the second communication unit 24-2, for example. The first communication unit 24-1 and the first LAN 14-1 are connected to each other via, for example, a communication cable. The second communication unit 24-2 and the second LAN 14-2 are connected to each other via, for example, a communication cable.

In the exemplary embodiment, the operation policy of the image forming device 10 is determined in advance. For example, in a case where the image forming device 10 accepts a usage request for using the image forming device 10 from one of the user terminals 12 via the first communication unit 24-1, the image forming device 10 authenticates the user terminal 12 or the user of the user terminal 12. In a case where authentication has successfully been performed, the image forming device 10 performs processing in response to the accepted usage request. Also, for example, in a case where the image forming device 10 accepts a usage request for using the image forming device 10 from one of the user terminals 12 via the second communication unit 24-2, the image forming device 10 performs processing in response to the usage request without authenticating the user terminal 12 or the user of the user terminal 12.

In the exemplary embodiment, the processing performed by the image forming device 10 in response to a usage request accepted via the second communication unit 24-2 is limited to part of the processing performed by the image forming device 10 in response to a usage request accepted via the first communication unit 24-1. For example, the protocols used in the processing performed in response to a usage request accepted via the first communication unit 24-1 are not limited. However, the protocols used in the processing performed in response to a usage request accepted via the second communication unit 24-2 are limited to part of the protocols used in the processing performed in response to a usage request accepted via the first communication unit 24-1.

Figure 2:
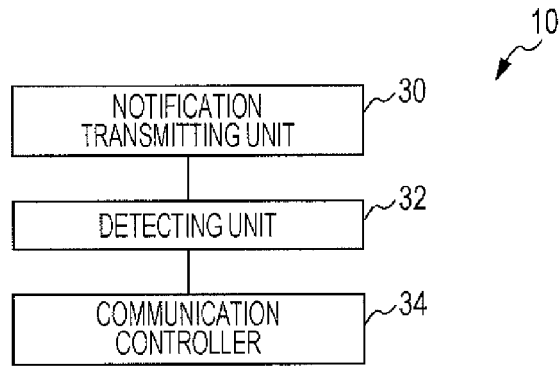
FIG. 2 is a functional block diagram illustrating an example of the functions implemented by an image forming device according to the exemplary embodiment of the present invention.

FIG. 2 is a functional block diagram illustrating an example of the functions implemented by the image forming device 10 according to the exemplary embodiment. As illustrated in FIG. 2, the image forming device 10 according to the exemplary embodiment functionally includes, for example, a notification transmitting unit 30, a detecting unit 32, and a communication controller 34. These functions are implemented by executing, with the controller 20 of the image forming device 10, a program including instructions corresponding to these functions installed into the image forming device 10, which is a computer. The program is supplied to the image forming device 10 via a computer readable information storage medium, such as an optical disc, a magnetic disk, a magnetic tape, a magneto-optical disc, or a flash memory, or via a communication medium, such as the Internet.

When the communication unit 24 is started or upon a communication cable being inserted to the communication unit 24, the notification transmitting unit 30 transmits, to the LAN 14 connected to the communication unit 24, a notification indicating that the image forming device 10 has been connected to the LAN 14 (hereinafter referred to as a "connection notification"). This notification corresponds to, for example, a Hello message of WSD-Discovery. The connection notification transmitted to the LAN 14 is received by devices connected to the LAN 14 (here, for example, the user terminals 12). For example, in a case where the notification transmitting unit 30 transmits a connection notification from the first communication unit 24-1 to the first LAN 14-1, the user terminals 12-1 in the first group connected to the first LAN 14-1 receive the connection notification. For example, in a case where the notification transmitting unit 30 transmits a connection notification from the second communication unit 24-2 to the second LAN 14-2, the user terminals 12-2 in the second group connected to the second LAN 14-2 receive the connection notification. In the exemplary embodiment, the connection notification transmitted to the first LAN 14-1 does not reach the second LAN 14-2. Also, in the exemplary embodiment, the connection notification transmitted to the second LAN 14-2 does not reach the first LAN 14-1.

In addition, in the case of halting communication performed by the communication unit 24, for example, the notification transmitting unit 30 transmits, to the LAN 14 connected to the communication unit 24, a notification indicating that communication performed by the communication unit 24 is to be halted (hereinafter referred to as a "communication halt notification"). This notification corresponds to, for example, a Bye message of WSD-Discovery. For example, in a case where the communication transmitting unit 30 transmits a communication halt notification from the first communication unit 24-1 to the first LAN 14-1, the user terminals 12-1 in the first group connected to the first LAN 14-1 receive the communication halt notification. Also, for example, in a case where the communication transmitting unit 30 transmits a communication halt notification from the second communication unit 24-2 to the second LAN 14-2, the user terminals 12-2 in the second group connected to the second LAN 14-2 receive the communication halt notification. In the exemplary embodiment, the communication halt notification transmitted to the first LAN 14-1 does not reach the second LAN 14-2. Also, in the exemplary embodiment, the communication halt notification transmitted to the second LAN 14-2 does not reach the first LAN 14-1.

The detecting unit 32 monitors a notification received by the communication unit 24. Also, the detecting unit 32 detects a notification received by the communication unit 24.

In accordance with the detection of reception of a notification by the detecting unit 32, the communication controller 34 performs control so that communication is not performed by at least one of the first communication unit 24-1 and the second communication unit 24-2. Here, performing control so that communication is not performed by the communication unit 24 corresponds to, for example, performing control so that communication with a specific protocol performed by the communication unit 24 is halted (that is, performing control so that a service provided by the communication unit 24 is stopped), performing control so that a communication interface is stopped (for example, performing control so that packet transmission by the communication unit 24 is stopped), performing control so that a communication interface is disconnected (for example, performing control so that link-down occurs), or the like.

In the exemplary embodiment, the memory 22 of the image forming device 10 stores in advance operation setting data, which indicates the setting of an operation in a case where both the first communication unit 24-1 and the second communication unit 24-2 are improperly connected to the same LAN 14 (here, for example, the first LAN 14-1 or the second LAN 14-2). In the exemplary embodiment, the value of the operation setting data represents, for example, a function provision priority mode in which a service is provided via any one of the communication units 24 (for example, processing is performed in response to a usage request), or a security priority mode in which a service is not provided (for example, processing is not performed in response to a usage request).

Figure 3:
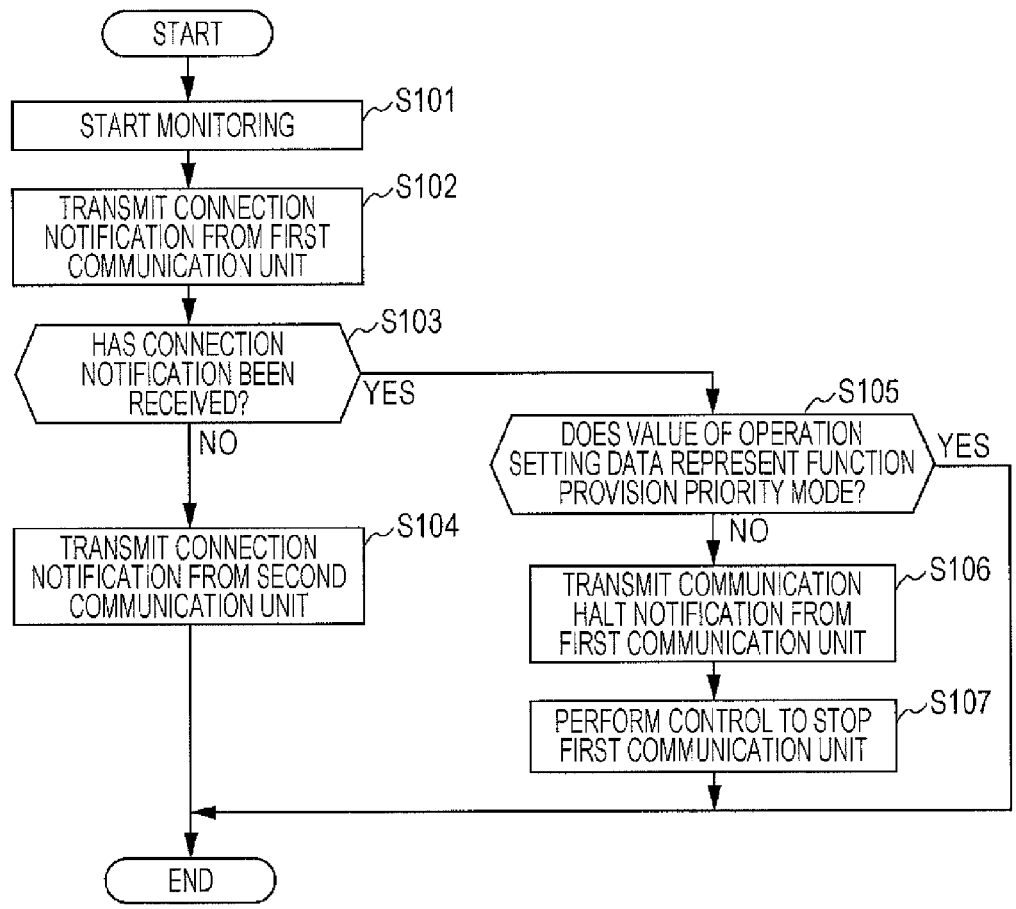
FIG. 3 is a flowchart illustrating an example of the flow of processing performed by the image forming device according to the exemplary embodiment of the present invention.

Now, an example of the flow of processing performed by the image forming device 10 according to the exemplary embodiment will be described with reference to the flowchart illustrated in FIG. 3. The processing is performed when the image forming device 10 starts up upon power-on.

Upon power-on of the image forming device 10, in step S101, the detecting unit 32 starts monitoring a notification received by the communication unit 24. In this example of processing, the detecting unit 32 starts monitoring a notification received by the first communication unit 24-1 and a notification received by the second communication unit 24-2.

In step S102, the notification transmitting unit 30 transmits a connection notification indicating that the image forming device 10 has been connected to the LAN 14 (for example, a Hello message) from the first communication unit 24-1 to the LAN 14 connected to the first communication unit 24-1.

In step S103, the detecting unit 32 determines whether or not the connection notification transmitted from the first communication unit 24-1 in step S102 has been received via the second communication unit 24-2. In this example of processing, during a period from when step S102 is completed to when a predetermined time period elapses, the detecting unit 32 determines whether or not the connection notification transmitted from the first communication unit 24-1 in step S102 has been received via the second communication unit 24-2.

The situation where it is determined in step S103 that the notification transmitted from the first communication unit 24-1 in step S102 has been received via the second communication unit 24-2 occurs, for example, in a case where both the first communication unit 24-1 and the second communication unit 24-2 are connected to the first LAN 14-1, or in a case where both the first communication unit 24-1 and the second communication unit 24-2 are connected to the second LAN 14-2.

If it is not determined in step S103 that the connection notification transmitted from the first communication unit 24-1 in step S102 has been received via the second communication unit 24-2 (NO in step S103), the notification transmitting unit 30 transmits a connection notification indicating that the image forming device 10 has been connected to the LAN 14 (for example, a Hello message) from the second communication unit 24-2 to the LAN 14 connected to the second communication unit 24-2 in step S104, and the processing ends.

If it is determined in step S103 that the connection notification transmitted from the first communication unit 24-1 in step S102 has been received via the second communication unit 24-2 (YES in step S103), it is determined whether or not the value of operation setting data stored in the memory 22 represents the function provision priority mode in step S105.

If the value of operation setting data stored in the memory 22 represents the function provision priority mode (YES in step S105), the processing ends.

If the value of operation setting data stored in the memory 22 does not represent the function provision priority mode, that is, represents the security priority mode (NO in step S105), the notification transmitting unit 30 transmits, from the first communication unit 24-1, a communication halt notification indicating that communication performed by the first communication unit 24-1 is to be halted (for example, a Bye message) in step S106. Subsequently, the communication controller 34 performs control to stop the first communication unit 24-1 in step S107, and the processing ends.

In the above-described example of processing, if it is not determined in step S103 that the connection notification transmitted from the first communication unit 24-1 in step S102 has been received via the second communication unit 24-2, the image forming device 10 provides a service via the first communication unit 24-1 and provides a service via the second communication unit 24-2.

If it is determined in step S103 that the connection notification transmitted from the first communication unit 24-1 in step S102 has been received via the second communication unit 24-2, and if it is determined in step S105 that the value of operation setting data stored in the memory 22 represents the function provision priority mode, the image forming device 10 provides a service via the first communication unit 24-1 but does not provide a service via the second communication unit 24-2. In this case, the communication controller 34 performs control so that communication is not performed by the second communication unit 24-2.

If it is determined in step S103 that the connection notification transmitted from the first communication unit 24-1 in step S102 has been received via the second communication unit 24-2, and if it is determined in step S105 that the value of operation setting data stored in the memory 22 represents the security priority mode, the image forming device 10 does not provide a service via the first communication unit 24-1 and does not provide a service via the second communication unit 24-2. In this case, the communication controller 34 performs control so that communication is not performed by the first communication unit 24-1 nor by the second communication unit 24-2.

Figure 4:
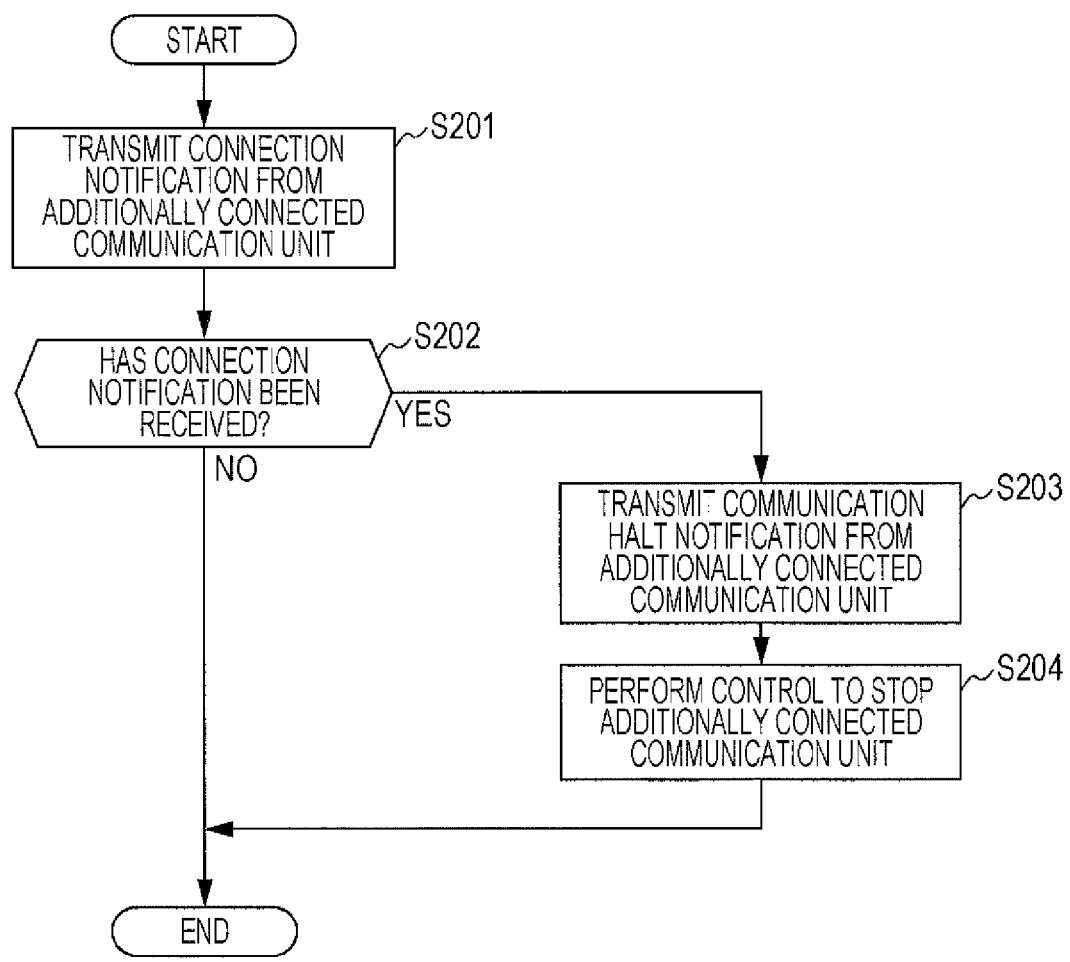
FIG. 4 is a flowchart illustrating an example of the flow of processing performed by the image forming device according to the exemplary embodiment of the present invention.

Next, an example of the flow of processing performed by the image forming device 10 according to the exemplary embodiment will be described with reference to the flowchart illustrated in FIG. 4. The processing is performed in a case where dynamic insertion or extraction of a communication cable connected to the communication unit 24 of the image forming device 10 according to the exemplary embodiment occurs. In this example of processing, it is assumed that, while the image forming device 10 is providing a service via one of the first communication unit 24-1 and the second communication unit 24-2 (hereinafter referred to as a "connected communication unit"), a communication cable is inserted to the other (hereinafter referred to as an "additionally connected communication unit"). Also, it is assumes that, at the start of the processing, the detecting unit 32 monitors a notification received by the first communication unit 24-1 and a notification received by the second communication unit 24-2.

Upon a communication cable being inserted to an additionally connected communication unit, in step S201, the notification transmitting unit 30 transmits a connection notification indicating that the additionally connected communication unit has been connected to the LAN 14 (for example, a Hello message) from the additionally connected communication unit to the LAN 14 connected to the additionally connected communication unit.

In step S202, the detecting unit 32 determines whether or not the connection notification transmitted from the additionally connected communication unit in step S201 has been received via the connected communication unit. In this example of processing, during a period from when step S201 is completed to when a predetermined time period elapses, the detecting unit 32 determines whether or not the connection notification transmitted from the additionally connected communication unit in step S201 has been received via the connected communication unit.

The situation where it is determined in step S202 that the notification transmitted from the additionally connected communication unit in step S201 has been received via the connected communication unit occurs, for example, in a case where the additionally connected communication unit is connected to the first LAN 14-1 while the connected communication unit is connected to the first LAN 14-1, or in a case where the additionally connected communication unit is connected to the second LAN 14-2 while the connected communication unit is connected to the second LAN 14-2.

If it is not determined in step S202 that the connection notification transmitted from the additionally connected communication unit in step S201 has been received via the connected communication unit (NO in step S202), the processing ends.

If it is determined in step S202 that the connection notification transmitted from the additionally connected communication unit in step S201 has been received via the connected communication unit (YES in step S202), the notification transmitting unit 30 transmits a communication halt notification indicating that communication performed by the additionally connected communication unit is to be halted (for example, a Bye message) from the additionally connected communication unit in step S203. In step S204, the communication controller 34 performs control to stop the additionally connected communication unit, and the processing ends.

In the above-described example of processing, if it is not determined in step S202 that the connection notification transmitted from the additionally connected communication unit in step S201 has been received via the connected communication unit, the image forming device 10 provides a service via the first communication unit 24-1 and provides a service via the second communication unit 24-2.

If it is determined in step S202 that the connection notification transmitted from the additionally connected communication unit in step S201 has been received via the connected communication unit, the image forming device 10 provides a service via the connected communication unit, but does not provide a service via the additionally connected communication unit. In this case, the communication controller 34 performs control so that communication is not performed by the additionally connected communication unit.

In the exemplary embodiment, in a case where one of the user terminals 12 receives a connection notification transmitted from the image forming device 10 via the LAN 14 connected to the user terminal 12, identification information such as the name of the image forming device 10 is displayed on a search result screen for an available device, the search result screen being displayed on a display by the user terminal 12 in accordance with a request for searching for a device accepted by a user. After that, in a case where the user terminal 12 receives a communication halt notification transmitted from the image forming device 10 via the LAN 14 connected to the user terminal 12, identification information such as the name of the image forming device 10 disappears from the search result screen. In a case where the user terminal 12 transmits a request for processing to the device associated with the identification information displayed on the search result screen, the device performs processing in response to the request.

In the exemplary embodiment, in a case where plural communication units 24 included in the image forming device 10 are connected to a LAN 14, the number of communication units 24 that are available, by the user terminals 12 connected to the LAN 14, as a communication path between the image forming device 10 and the user terminals 12 is one at the maximum. Also, in the exemplary embodiment, even in a case where both the first communication unit 24-1 and the second communication unit 24-2 of the image forming device 10 are connected to the first LAN 14-1, a situation is prevented from occurring where both the identification information associated with the first communication unit 24-1 of the image forming device 10 and the identification information associated with the second communication unit 24-2 of the image forming device 10 are displayed on the search result screen for a device available by the user terminals 12. Further, in the exemplary embodiment, in a case where a user is to use the image forming device 10 that is not compliant with the operation policy, the possibility of occurrence of operation failure in which, for example, a user authorized to use the image forming device 10 is not allowed to use the image forming device 10 (for example, not allowed to perform printing), or a user not authorized to use the image forming device 10 is allowed to use the image forming device 10, may be reduced. Also, in the exemplary embodiment, the possibility of occurrence of redundant processing in DNS lookup or SMB name resolution may be reduced.

The embodiment of the present invention is not limited to the above-described exemplary embodiment.

For example, in step S203, the notification transmitting unit 30 may transmit, from the connected communication unit, a communication halt notification indicating that communication performed by the connected communication unit is to be halted. Then, in step S204, the communication controller 34 may perform control to stop the connected communication unit.

Also, for example, if it is determined in step S103 that the notification transmitted from the first communication unit 24-1 in step S102 has been received via the second communication unit 24-2, and if it is determined in step S105 that the value of operation setting data stored in the memory 22 represents the function provision priority mode, the notification transmitting unit 30 may transmit, from the first communication unit 24-1, a communication halt notification indicating that communication performed by the first communication unit 24-1 is to be halted, and the communication controller 34 may perform control to stop the first communication unit 24-1. In this case, the notification transmitting unit 30 may transmit, from the second communication unit 24-2, a connection notification indicating that the image forming device 10 has been connected to the LAN 14 to the LAN 14 connected to the second communication unit 24-2.

The image forming device 10 according to the exemplary embodiment may include plural housings. Also, the exemplary embodiment may be applied to a general information processing device other than the image forming device 10. The above-described specific character strings and numerals, and the specific character strings and numerals in the drawings are examples, and the embodiment of the present invention is not limited to these character strings and numerals.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a first communication interface connected to a first communication medium, wherein the first communication medium comprises a first local area network, and wherein the first communication interface is a connection to the first local area network;
   a second communication interface connected to a second communication medium, wherein the second communication medium comprises a second local area network that is different from the first local area network, and wherein the second communication interface is a connection to the second local area network;
   a notification transmitting unit that transmits a connection notification indicating that the first communication interface has been connected to the first communication medium and indicating that a device serving as a transmission source has been connected to the first communication medium;
   a detecting unit that detects whether the connection notification transmitted from the first communication interface has been received by the second communication interface via the second communication medium; and
   a controller that, in response to the detecting unit detecting that the connection notification has been transmitted from the first communication interface to the second communication medium connected to the second communication interface, receives a communication halt notification, from the notification transmitting unit, so that communication is not performed by at least one of the first communication interface and the second communication interface, wherein the notification transmitting unit and the detecting unit are operable on the controller.

2. The information processing device according to claim 1, wherein, in a case where the detecting unit detects, while communication is being performed by the first communication interface, a notification transmitted from the second communication interface to the communication medium connected to the second communication interface and indicating that a device serving as a transmission source has been connected to the communication medium, the controller performs control so that communication is not performed by the second communication interface.

3. The information processing device according to claim 1, wherein, in a case where the detecting unit detects a notification transmitted from the second communication interface to the communication medium connected to the second communication interface and indicating that a device serving as a transmission source has been connected to the communication medium, the controller performs control so that communication is not performed by the first communication interface nor by the second communication interface.

4. The information processing device according to claim 1, wherein the first communication medium and second communication medium are separate from each other.

5. An information processing method comprising:

detecting a connection notification, transmitted by a first communication interface connected to a first communication medium and received by a second communication interface connected to a second communication medium, indicating that the first communication interface has been connected to the first communication medium and indicating that a device serving as a transmission source has been connected to the first communication medium, wherein the first communication medium comprises a first local area network, wherein the first communication interface is a connection to the first local area network, and wherein the second communication medium comprises a second local area network that is different from the first local area network, and wherein the second communication interface is a connection to the second local area network; and in response to detecting that the connection notification has been transmitted from the first communication interface to the second communication medium connected to the second communication interface, receiving a communication halt notification to perform control, by a computer, so that communication is not performed by at least one of the first communication interface and the second communication interface.

6. A non-transitory computer readable medium storing a program causing a computer to execute a process, the process comprising:

detecting a connection notification, transmitted by a first communication interface connected to a first communication medium and received by a second communication interface connected to a second communication medium, indicating that the first communication interface has been connected to the first communication medium and indicating that a device serving as a transmission source has been connected to the first communication medium, wherein the first communication medium comprises a first local area network, wherein the first communication interface is a connection to the first local area network, and wherein the second communication medium comprises a second local area network that is different from the first local area network, and wherein the second communication interface is a connection to the second local area network; and in response to detecting that the connection notification has been transmitted from the first communication interface to the second communication medium connected to the second communication interface, receiving a communication halt notification to perform control, by a computer, so that communication is not performed by at least one of the first communication interface and the second communication interface.

* * * * *